United States Patent Office 3,091,883
Patented June 4, 1963

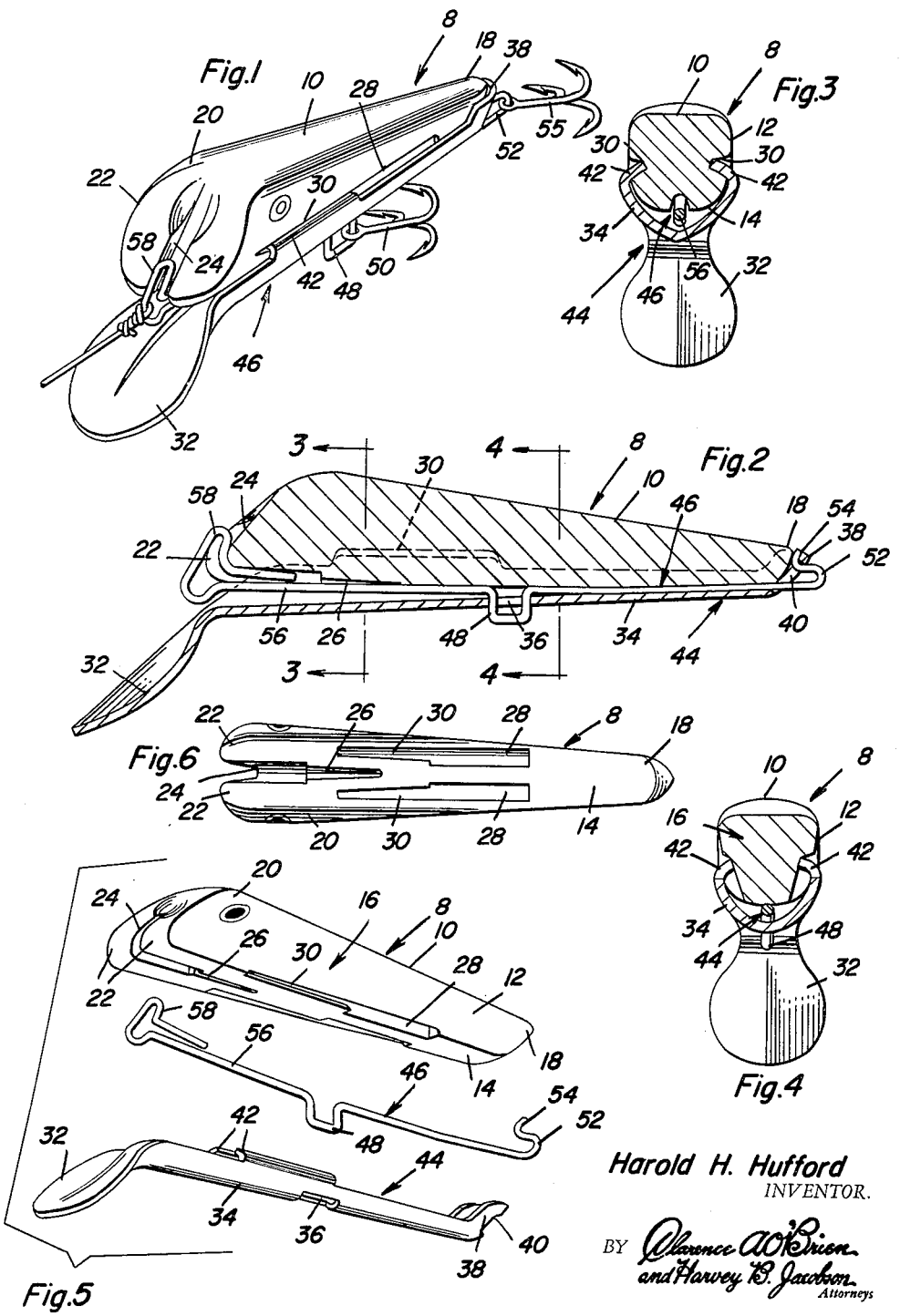

3,091,883
INTERCHANGEABLE LURE BODIES AND SINGLE SUPPORT MEANS THEREFOR
Harold H. Hufford, Warren, Ohio, assignor of one-half to Robert C. Shape, Warren, Ohio
Filed June 28, 1961, Ser. No. 120,438
4 Claims. (Cl. 43—42.08)

The present invention relates to a fishing lure having novel and improved hook-equipped supporting means for selectively usable interchangeable plugs of many and varied shapes, sizes, and colorful patterns.

More specifically, the invention has to do with a fishing lure characterized by separably connectible component parts which are capable of being manually assembled and disassembled to vary the usable appearance and effect of said lure.

Briefly the lure comprises a novel plug and equally novel support means therefor. The support means is characterized by an adapter or mounting plate having a depending diving vane at the forward end of the plate. Interposed between the adapter plate and a ventral surface of the plug is a specially constructed bridle functioning as hook suspending and line attaching means and also as means for latching the adapter plate on the plug.

One improvement resides in the construction of the plug. To this end the forward or leading end of the head of the plug is bifurcated to provide a keeper seat. Spaced longitudinal grooves are provided on the ventral side or surface to accommodate keying flanges being provided on a median portion of the adapter plate. The ventral side is also provided with piloting means for a latchable keeper carried by the bridle.

The adapter plate is novel in that it is provided with a suitably angled diving vane at the leading or forward end and with attaching and keying flanges intermediate its ends, said plate also having means at the trailing end to assist in positioning and retaining a component part of the bridle.

The bridle is unique in that it has bent portions which serve as attaching eyes for the fishing line and also for suspended fishing hooks, two of said eyes being releasably connectible with slotted portions of the adapter plate thus cooperatively associating the bridle and adapter plate in a novel manner; said bridle comprising a wire the forward portion of which constitutes a resilient latching finger terminating in a keeper and said keeper being releasably engageable in the aforementioned keeper seat.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of the improved lure showing the changeable plug, vane-equipped adapter plate and hook suspending bridle line attaching and latching means;

FIGURE 2 is a central longitudinal sectional view through the assemblage depicted in FIGURE 1;

FIGURES 3 and 4 are sections on the transverse vertical lines 3—3 and 4—4 respectively of FIGURE 2;

FIGURE 5 is an exploded perspective view; and

FIGURE 6 is a bottom plan view of the plug.

With reference to FIGURE 5 the lure proper comprises an elongated wooden, plastic or an equivalent plug denoted generally by the numeral 8 and here shown as elongated and having a dorsal or top side 10, flat longitudinal sides 12 and a ventral side 14 which is substantially flat. The median or body portion is designated generally at 16, the tail portion at 18 and the head portion at 20. The nose of the head portion is bifurcated to provide spaced furcations 22 and an intervening crotch which defines a keeper seat 24. The keeper seat actually extends back into the ventral side where it registers with a substantially V-shaped piloting channel 26. The median part of the ventral side is provided with a pair of duplicate spaced parallel keying grooves having wide rear end portions 28 and restricted leading or forward end portions 30.

The next and significant component unit is the spoon-shaped diving vane or baffle 32. This is at the forward end of an adapter and attaching plate 34 which is channel-shaped in cross-section as more clearly seen in FIGURES 3 and 4. The central web of the channel is provided with a slot 36 and the rear end portion is directed rearwardly and upwardly at an approximate oblique angle as at 38 and is provided with a clearance slot 40. The side walls of the channel are provided intermediate their ends with upwardly and inwardly directed keying flanges 42 which are angled and shaped and otherwise made to be removably fitted into and keyed and anchored in place in the keying slots 28 and 30. This adapter as an entity is denoted by the numeral 44. The plug 8 is attached to the vane unit 44 or vice versa the unit 44 is removably suspended from the ventral side of the plug. The third component part comprises a fishhook suspension and line attaching member which is here referred to as a bridle and is generally denoted by the numeral 46. It comprises a length of wire the median portion of which has a U-shaped bend 48 therein which is fitted removably through the slot 36 and thus provides an attaching eye for the multiple pronged fishhook as shown in FIGURE 1. The rear end portion has a U-shaped return bend or bent portion 52 with a detent 54. This U-shaped portion fits through the slot 40 and provides an eye for the hook 55. The forward half of the wire provides a resilient latching finger 56 the forward end of which is bent upon itself to provide a suitable detent 58 which is engageable in the keeper seat 24.

It will be clear that the components 44 and 46 constitute an assembly in that they are separably linked together, the U-shaped bend 52 extending through the slot in the rear extension 38 and being held in place by the detent 54 thus providing an attachment for the rear fishhook 55. The U-shaped bend 48 extending through the slot 36 accommodates the fishhok 50 and thus these component parts 44, 46 and the fishhooks are assembled as an entity. This entity is releasably engageable with the plug or contrawise the plug 8 can be fitted on the assembly comprising the components 46 and 44 in an easily attachable and detachable manner.

Assuming that the plug 8, adapter plate 44 and the companion intervening latching and hook suspending bridle 46 are assembled as shown in FIGURE 1 and it is desired to detach the plug from the relatively shiftable plate-bridle assembly, the most satisfactory procedure is to grip the vane 32 with the fingers of one hand (the left hand for instance), catch hold of the plug 8 with the other hand, release the latch or detent 58 with the thumb on the left hand and shift the plug (say from right to left) and while still holding the vane, slide the plug in a manner to disengage the keying flanges 42 from the keying grooves 28. By following these same steps in reverse the plug may be replaced to provide the ready-to-use lure illustrated in FIGURE 1.

It is believed that careful consideration of the specification and claims in conjunction with the views of the drawings will enable the reader to obtain a clear understanding of the construction, features and advantages and mode of use of the improved lure. Therefore, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lure comprising a fishing plug embodying body, head and tail portions, said body portion having a ventral surface and provided with at least one lengthwise keying groove, said head portion having spaced furcations defining an intervening keeper seat, an elongated adapter plate for said plug adjacent to and generally parallel with said ventral surface, said plate having a forward end provided with an angularly deflected vane, a median portion of said plate having a laterally bent lengthwise keying flange removably keyed to said keying groove, the rearward end of said plate having a lateral terminal portion provided with a slot, and a fish hook attaching and suspending bridle comprising a length of wire having a bent portion projecting through an opening in said plate and providing a first hook hanging eye, also having a hook-like bent portion projecting through the slot in the aforesaid terminal portion and providing a second hook suspending eye, the forward end portion of said wire being resilient and providing a yieldable finger, said finger terminating at a free forward end thereof in a laterally bent detent, said detent being releasably engaged in said keeper seat.

2. The combination of claim 1, and wherein a forward end portion of said ventral surface adjacent the keeper seat is provided with a longitudinal centrally located piloting and guiding groove communicating at a forward end thereof with said keeper seat, said groove and finger being in alignment with each other, said detent being adapted to slide forwardly or rearwardly in said guiding groove, the yielding action of said finger facilitating disengagement of the detent from said keeper seat.

3. A lure embodying, in combination, a plug having body, head and tail portions and also having a substantially flat ventral side, said ventral side being provided to the left and right, respectively of the lengthwise central portion thereof with spaced generally parallel longitudinal keying grooves, said head having a keeper seat therein, an adapter plate commensurate in length with the length of said ventral side and provided at a forward end with a depending angularly disposed vane, said plate being further provided on a median portion thereof with opposed spaced parallel keying flanges and said flanges being bent toward each other and slidingly and removably fitted and retained in their respective keying grooves, and a wire bridle interposed between the plate and said ventral side, said bridle embodying a flexibly resilient latching finger having a keeper at a free forward end thereof, said keeper being releasably engageable in said keeper seat, said ventral side being provided with a longitudinal centrally disposed piloting and keying groove communicating with the keeper seat at the forward end of the groove, said piloting groove functioning to temporarily seat and guide the keeper when it is being slid either toward or from said keeper seat.

4. An interchangeable lure comprising, in combination, a plug having a body portion, a tail portion, a head portion, and a generally flat ventral surface, the leading end of said head portion having a centralized keeper seat, said ventral surface having a central longitudinally disposed piloting groove communicable at its forward end with said keeper seat, said body portion being provided with spaced parallel longitudinally extending keying grooves located to the left and right, respectively, of the intervening piloting groove, an elongated plate commensurate in length with the length of the ventral side of said plug, said plate being provided on a median portion thereof with oppositely disposed spaced parallel turned-in keying flanges, the turned-in portions of said flanges being removably and slidingly fitted in their respective keying grooves, said plate being provided at a leading end thereof with an oblique-angled depending vane, said vane being in general alignment with the leading end of said head portion, and a wire bridle interposed between said ventral surface and the adjacent lengthwise interior surface of said plate, said bridle having longitudinally spaced bent portions releasably fitting into coacting slots provided therefor in said plate, said bridle having a forward end provided with a flexibly resilient latching finger, said latching finger terminating in a keeper and said keeper being slidingly cooperable with the piloting groove and registrably and releasably cooperable with said keeper seat.

References Cited in the file of this patent

UNITED STATES PATENTS

| 2,204,552 | Singleton | June 18, 1940 |
| 2,482,466 | Cooper | Sept. 20, 1949 |
| 2,587,736 | Kindscher | Mar. 4, 1952 |
| 2,604,716 | Hair | July 29, 1952 |
| 2,612,716 | Hedland | Oct. 7, 1952 |

FOREIGN PATENTS

| 1,123,087 | France | June 4, 1956 |